P. PFEFFER.

LUMBER-DRIERS.

No. 7,206. Reissued July 4, 1876.

WITNESSES:

W W Hollingsworth

J. C. Kennon

INVENTOR:

Philipp Pfeffer

BY

Wm V. B.

ATTORNEYS.

UNITED STATES PATENT OFFICE.

PHILIPP PFEFFER, OF NEW YORK, N. Y.

IMPROVEMENT IN LUMBER-DRIERS.

Specification forming part of Letters Patent No. 163,403, dated May 18, 1875; reissue No. 7,206, dated July 4, 1876; application filed June 24, 1876.

*To all whom it may concern:*

Be it known that I, PHILIPP PFEFFER, of the city, county, and State of New York, have invented a new and useful Improvement in Lumber-Driers; and I do hereby declare that the following is a full, clear, and exact description of the same, reference being had to the accompanying drawing, forming part of this specification, in which—

Figure 1:
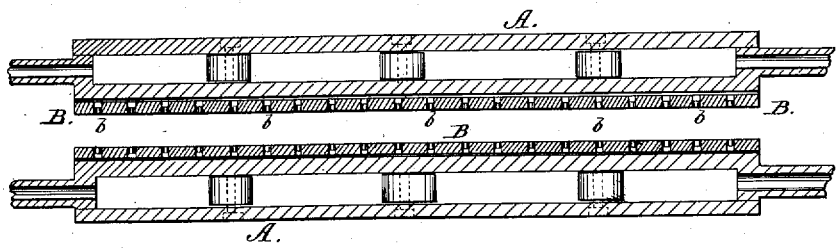
Figure 2:
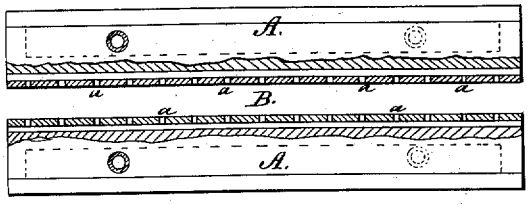
Figure 3:
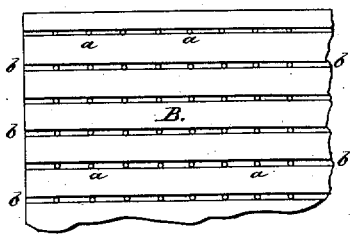

Figure 1 represents a vertical longitudinal section of my improved press for drying lumber. Fig. 2 is a side view of the same, partly in section, to show grooved and perforated face of press-plates; and Fig. 3 is a detail view of the interior side of the grooved and perforated face-lining.

My invention relates to an improved apparatus for drying lumber of varying thickness within short time by the influence of pressure and heat; and it consists in introducing the boards or other pieces of lumber between press-plates heated by steam, and provided with a perforated face-lining, with connecting grooves at the inner side, for admitting the escape of the moisture in the lumber.

In the drawing, A represents the press-plates of my improved lumber-drying machine, which are made hollow, and of suitable size and strength, according to the size of lumber to be dried thereby. The plates are heated by permitting steam to enter at one side and leave at the opposite side. The press-plates A are provided with additional face plates or lining B, of brass, copper, or other material, and screwed or otherwise attached thereto. The face-lining B has a number of perforations, *a*, that are connected, by grooves *b*, at the inner side, so as to leave spaces or channels between the lining and press-plates, which connect the perforations to the side of the same. Lumber of any size and thickness, according to the purpose required, from veneers to one or two inch boards, or more, is introduced between the press-plates, and exposed to the joint action of the pressure and dry heat of the press-plates. The moisture of the lumber is thereby changed into steam, which passes through the perforations *a* of the lining, and issues through the channels *b* to the outside, producing within a short time the perfect straightening and complete drying of the lumber. The compression of the lumber fibers and the extraction of the moisture render the lumber not liable to warp, but cause it to retain a perfectly straight and smooth condition, capable of being instantly worked up in the trades, thus doing away with the expensive modes of seasoning and drying lumber heretofore used. I have found by actual tests that boards of one inch in thickness are completely seasoned by being exposed for about ten minutes to the combined pressure and steam action of my press. The cessation of the issuing of any steam from the channels indicates when the process of drying is completed.

Having thus described my invention, what I claim as new is—

1. In an apparatus for drying lumber, press-plates adapted to be heated, and having vents opening upon their opposing faces, for the escape of the vaporized moisture of the wood, substantially as described.

2. In an apparatus for drying lumber, hollow press-plates adapted to be heated by steam, and having vents opening upon their opposing faces, for the escape of the vaporized moisture of the wood, substantially as described.

3. In an apparatus for drying lumber, the combination of the heated press-plates with face or lining plates having perforations and connecting-channels, for the escape of the vaporized moisture of the wood, substantially as described.

4. In an apparatus for drying lumber, the combination of hollow steam-heated press-plates A and face or lining plates B, having perforations and connecting-channels between press-plate and lining, for the escape of the vaporized moisture of the wood, substantially as herein shown and described.

PHILIPP PFEFFER.

Witnesses:
GEO. W. READ,
WM. A. READ.